US012780456B2

(12) United States Patent
Bradley et al.

(10) Patent No.: US 12,780,456 B2
(45) Date of Patent: Nov. 3, 2026

(54) TETHERED DRONE SYSTEM

(71) Applicant: EOS Technology Holdings Inc., New York, NY (US)

(72) Inventors: Aiden Nathaniel Bradley, Tucson, AZ (US); Nathaniel T. Bradley, New York, NY (US); Joshua S. Paugh, Tucson, AZ (US)

(73) Assignee: EOS Technology Holdings Inc., New York, NY (US)

( * ) Notice: Subject to any disclaimer, the term of this patent is extended or adjusted under 35 U.S.C. 154(b) by 181 days.

(21) Appl. No.: 16/618,593

(22) PCT Filed: Jun. 13, 2018

(86) PCT No.: PCT/US2018/037370

§ 371 (c)(1),
(2) Date: Dec. 2, 2019

(87) PCT Pub. No.: WO2018/232010

PCT Pub. Date: Dec. 20, 2018

(65) Prior Publication Data

US 2020/0148348 A1 May 14, 2020

Related U.S. Application Data

(60) Provisional application No. 62/518,788, filed on Jun. 13, 2017.

(51) Int. Cl.
*B64U 10/60* (2023.01)
*G05D 1/00* (2006.01)
(Continued)

(52) U.S. Cl.
CPC ........... *B64U 10/60* (2023.01); *G05D 1/0094* (2013.01); *G05D 1/042* (2013.01); *B64U 30/20* (2023.01);
(Continued)

(58) Field of Classification Search
CPC ............ B64C 39/022; B64C 2201/208; B64C 2201/148; B64F 3/02
See application file for complete search history.

(56) References Cited

U.S. PATENT DOCUMENTS 3,381,922 A * 5/1968 Laing .................... B64C 39/022 244/17.17
2011/0315810 A1* 12/2011 Petrov .................... B64U 10/60 244/17.11
(Continued)

FOREIGN PATENT DOCUMENTS

CN 104973588 A * 10/2015
WO WO-2013013219 A1 * 1/2013 ............ B64U 10/11
WO WO-2013076711 A2 * 5/2013 ............... A47L 1/02

OTHER PUBLICATIONS

Wikipedia, Parrot AR.Drone, Sep. 27, 2012, as found on the internet archive at [https://web.archive.org/web/20120927195137/https://en.wikipedia.org/wiki/Parrot_AR.Drone] (Year: 2012).*
(Continued)

*Primary Examiner* — Justin Michael Heston
(74) *Attorney, Agent, or Firm* — Goodhue, Coleman & Owens, P.C.

(57) ABSTRACT

A tethered drone system and method includes a tethered drone and a tether. The tether includes a conductor to communicate at least power and control signals. The tethered drone system further includes a control system configured to receive the tethered drone. The control system provides power for the tethered drone. The control system includes a user interface for managing the control signals.

20 Claims, 6 Drawing Sheets

(51) Int. Cl.
*B64U 30/20* (2023.01)
*B64U 80/86* (2023.01)
*B64U 101/30* (2023.01)
*B64U 101/60* (2023.01)

(52) U.S. Cl.
CPC .......... *B64U 80/86* (2023.01); *B64U 2101/30* (2023.01); *B64U 2101/60* (2023.01); *B64U 2201/202* (2023.01)

(56) References Cited

U.S. PATENT DOCUMENTS

| | | | | |
|---|---|---|---|---|
| 2013/0134254 | A1* | 5/2013 | Moore ................... | B64U 10/60<br>244/17.11 |
| 2016/0200437 | A1* | 7/2016 | Ryan ...................... | B64U 10/60<br>244/99.2 |
| 2016/0318607 | A1* | 11/2016 | Desai ...................... | A01M 7/00 |
| 2017/0043869 | A1 | 2/2017 | Howard et al. | |
| 2017/0043872 | A1 | 2/2017 | Whitaker et al. | |
| 2017/0078552 | A1 | 3/2017 | Pochon et al. | |
| 2017/0259941 | A1* | 9/2017 | Briggs, IV ........... | G05D 1/0866 |
| 2020/0122830 | A1* | 4/2020 | Anderson ............... | B60L 50/60 |

OTHER PUBLICATIONS

Wikipedia, Parrot AR Drone, Sep. 27, 2012, as found on the internet archive [https://web.archive.org/web/20120927195137/https://en.wikipedia.org/wiki/parrot_ar.drone], 2012 (Year: 2012).*

Nasa, The First Mission of the Tethered Satellite System, 1992 (Year: 1992).*

International Search Report & Written Opinion, PCT/US18/37370, Sep. 12, 2018, 13 pages.

* cited by examiner

TETHERED DRONE SYSTEM

PRIORITY STATEMENT

This application is a 371 of International Application No PCT/US18/37370, filed Jun. 13, 2018, which claims the benefit of U.S. Provisional Patent Application No. 62/518,788 filed on Jun. 13, 2017 entitled Tethered Drone System, which are incorporated by reference in their entirety.

BACKGROUND

I. Field of the Disclosure

The illustrative embodiments relate to tethered drones. More specifically, but not exclusively, the illustrative embodiments relate to a system, method, and tethered drones for various forms of unmanned operation.

II. Description of the Art

In recent years drone availability and technology has developed significantly. Despite the improvements most drone systems are still limited by battery, control signal, and reliability issues. Many of the industries that could most benefit from drone technology have not been able to take advantage of the advances.

SUMMARY OF THE DISCLOSURE

The illustrative embodiments provide a tethered drone system, platform, and method including a tethered drone and a tether. The tether includes a conductor to communicate at least power and control signals. The tethered drone system further includes a control system configured to receive the tethered drone. The control system provides power for the tethered drone. The control system includes a user interface for managing the control signals.

Another embodiment provides a method for utilizing a tethered drone. The method may include activating controls for the tethered drone. The tethered drone is launched from a control vehicle. The tethered drone is controlled from a user interface utilizing a tether between the control vehicle and the tethered drone. The tethered drone is powered by the control vehicle through the tether.

Another embodiment provides a tethered drone system. The tethered drone system includes a drone deployed in space. A tether attaches between the drone and a control system to communicate power, data, and one or more materials. The control system includes an interface for controlling the tethered drone from an earth-based station. The tethered drone may deliver parts, materials, perform repairs, or load or unload payloads. The control system may be a satellite, orbital vehicle, or robotic system. The tether may also deliver a propellant.

The tethered drone may be utilized for astronautical mining, chemical analysis, adventure, astronomy, exploration, diagnostics, or telescopic sharing. The tethered drones in orbit may be perpetually charged, repaired, stored, upgraded (e.g., operating system, kernels, applications, software, etc.), hardware or capabilities loaded and unloaded via a series of aerial or in orbit charging stations.

The tethered drone may be used for delivering raw materials collected during mining and chemical operations and stored in the charging station storage bays for deposit of minerals and other collected space matter. The tethered drone may be powered by space-based solar power, rockets, propellers, and/or cold-gas, jets, butane, boosters, or other compressed air propulsion systems.

Another embodiment provides a tethered drone system include a drone deployed in water. The tether between the tethered drone and a ship delivers data, power, and one or more materials to the drone. The ship may act as a control system and may be utilized for long-term and short-term docking.

BRIEF DESCRIPTION OF THE DRAWINGS

Illustrated embodiments are described in detail below with reference to the attached drawing figures, which are incorporated by reference herein, and where.

DETAILED DESCRIPTION OF THE DISCLOSURE

Figure 1:
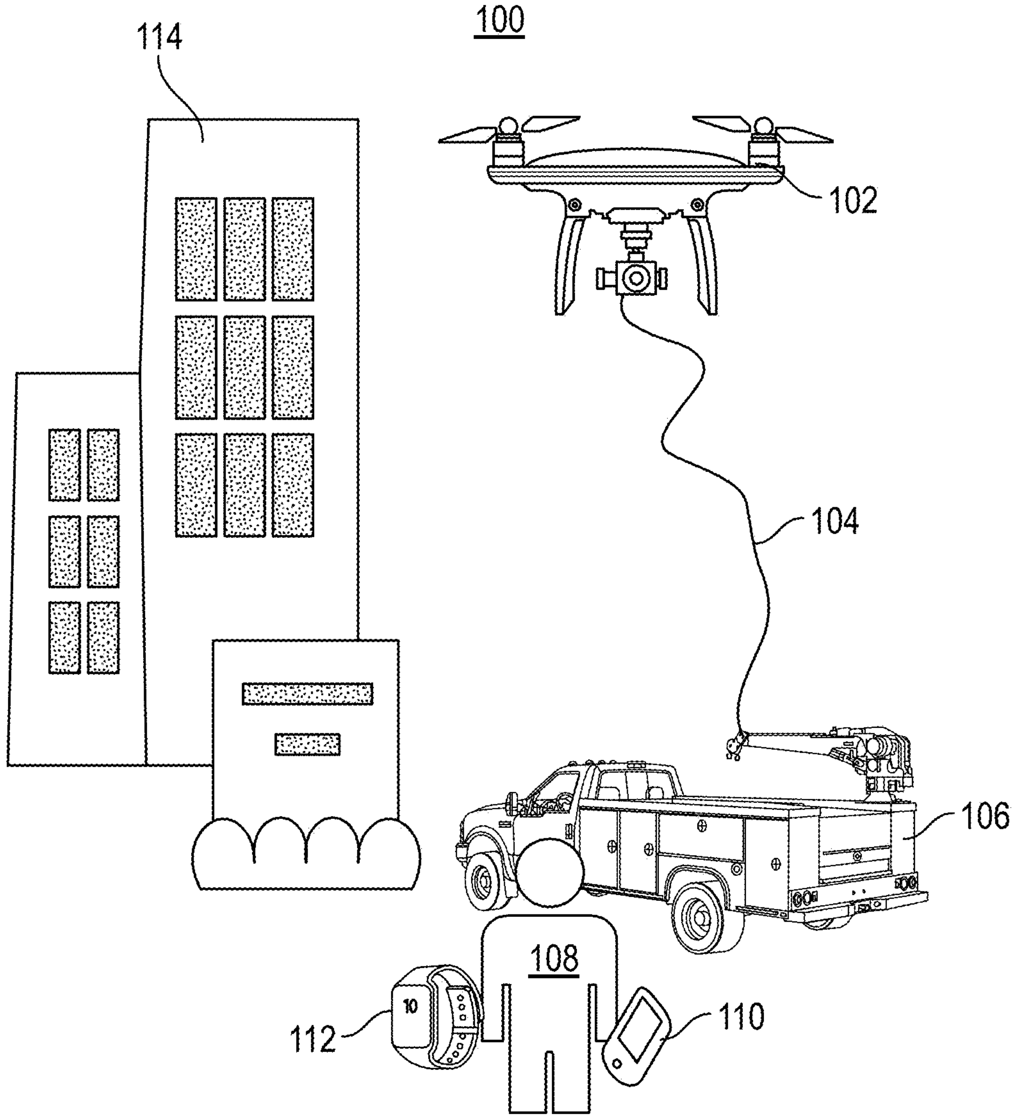
FIG. 1 is a pictorial representation of a tethered drone system in accordance with an illustrative embodiment.

The illustrative embodiments provide a system, method, platform, and tethered drones. Innovations to unmanned aerial vehicles, such as tethered drones, allows humans to command drone, droid, aerospace, and chemical analysis systems, which can be applied to a variety of terrestrial or space-based industrial services, scientific exploration, expeditions, remote monitoring (e.g., traffic, crops, mining, etc.).

These illustrative embodiments allow for the utilization of autonomous vehicles that further utilize innovations including optical masking and space exploration drones which utilize command center software to create an networked infrastructure. Through a focus on safety, science and value creation these embodiments advance humankind into an era of unprecedented exploration, discovery and prosperity.

The illustrative embodiments further disclose tethering of drones and unmanned aerial vehicles (UAV) systems composed of drones and other unmanned vehicles that utilize tethering cables to maintain flight in the sky perpetually via power supplied from a ground based, aerial, or other mobile supply source and are suitable for various industry applications, such as television broadcasting, signal relay, video surveillance, crop monitoring, and so forth. When mounted to various mobile control systems, tethered drones are reduced in size to perform non-passive and industrialized tasks. Some industrialized applications include cleaning surfaces, such as windows and sky scrapers, delivering organic fertilizers and pesticides, and many other real world industrial applications. Additionally, the tethered drones of the illustrative embodiments may be utilized in aeronautical, astronautical, terrestrial, extraterrestrial, land based, aquatic, oceanic and other applications. These illustrative embodiments have taken drones from observational based utilizations to task-based utilizations, which allow the drones to perform a broader series of tasks in robotics, research, and many other areas of scientific, astronautical and industrial applications.

Some benefits of the illustrative embodiments include: 1) uninterrupted mission through tethering of ground-based resources; 2) Broadband signal transmission via optical fiber and in-depth control panel analysis; 3) drone ascending, descending, and hovering controlled by the ground control station which can be mobile; 4) drone carrying and delivery of various mission payloads and apparatus for robotic systems and code transmission delivery; and 5) a "follow-me" function when a tethered drone is attached to a vehicle to remain tethered during operation. The tethered drones may also When a UAV is tether mounted on a vehicle, the UAV can be trained to follow a vehicle automatically while remaining tethered. The tethered drones, systems, and platforms as described herein may be customized to fulfill various usage needs and requirements.

The embodiments, components, and processes of FIGS. 1-6 may be combined in any number of formats. The description of FIGS. 1-6 as well as the other written description is applicable across the figures regardless of restrictions imposed thereon, whether natural or artificial.

FIG. 1 is a pictorial representation of a tethered drone system in accordance with an illustrative embodiment. The tethered drone system 100 includes a tethered drone 102, a tether 104, a control vehicle 106, a user 108 utilizing a wireless device 110 and a smart watch 112, and a structure 114.

In one embodiment, the tethered drone 102 represents an unmanned autonomous vehicle. The drone 102 may be configured to fly, drive, swim, crawl, wriggle, or otherwise propagate from one location to another. In one embodiment, the drone 102 may be a flying device including several propellers to create substantial lift. The tethered drone may include various types of unmanned aerial vehicles, multirotor, quadcopters, and so forth. The tethered drone 102 may also utilize jets, emission drives (e.g., gasses, liquids, ions, etc.), ducts, or so forth.

The tethered drone 102 may include any number of camera and imaging systems for still images, video, x-rays, thermal/infrared imaging, ultra violet imaging, and so forth. For example, the tethered drone 102 may capture visible light as well as infrared light for evaluating structures, individuals, animals, trees/plants, and other organic and inorganic objects. The tethered drone 102 may be able to operate at levels that are beyond the capabilities of standalone drones because power may be communicated to the drone 102 from the control vehicle 106. For example, the tethered drone 102 may carry loads, cargo, or tools that could not be lifted by battery only drones. The tethered drone 102 may also fly for time periods or indefinitely as compared to many drones that fly between 15 minutes and one hour.

In one embodiment, the tethered drone 102 may include a battery back up in the event that power is lost or the tethered drone 102 needs to temporarily detach from the tether 104. For example, a battery or ultracapacitor may be utilized to ensure that the tethered drone 102 is able to complete an ongoing action before landing/docking safely. The tethered drone 102 may also be coated with solar panels to provide additional power for the motors or other components of the tethered drone.

In one embodiment, the tethered drone may represent an unmanned autonomous vehicle (UAV). The UAV may be configured to travel and release additional orbital UAV charging stations above the Kármán Line, which delineates the atmosphere between earth and outer space located around 62 miles (100 km) above the surface of the Earth. For example, a graphene tether 104 may allow the tethered drone 102 to travel above the Karman line. In another embodiment, space-based solar power (SBSP), fuel cells, ultracapacitors, nuclear power, or other power generation/storage devices and techniques may be utilized to power the tethered drone 102. For example, the tethered drone 102 may travel to a specified altitude utilizing propellers before the tether 104 is released and jet engines carry the drone 102 above the Kármán Line into low earth orbit. In low earth orbit, the tethered drone 102 may then act as a base, charging station, or communications station for other drones. The tethered drone 102 may also dock, integrate with, or tether to any number of satellites or orbital devices for charging, communications, astronomy, element/compound sampling, remote sensing, crop monitoring, and so forth. The tethered drone 102 may be launched by a control vehicle 106 which may also represent a high-altitude balloon (i.e., 45 km altitude capability).

In one embodiment, a set of tethered drones may be utilized. For example, a first tethered drone 102 may carry the weight of the tether 104 while a second tethered drone positioned in series with the tether 104 may be released. Any number of tethered drones 102, from two to one hundred or more may, be interconnected in series or other patterns (e.g., parallel, circles of drones interconnected to form a cylinder, etc.).

Additionally, the drone can be tethered to a droid astronaut drone that is used to perform activities that are beyond the limit of the tether drone. The astronaut drone can perform many of the tasks associated with a human astronaut, such as various sample collections, repairs and safety checks.

In one embodiment, the tethered drone 102 may be tethered to a public safety, emergency service, or police vehicle (representing the control vehicle 106) that is used to monitor event occurrence, traffic congestion, vehicle speed, traffic accidents, and Amber alerts to assist local authorities and various public safety providers with traffic monitoring and traffic flow. When the need arises for a tethered drone 102 to be undetectable for instance in a police-based monitoring scenario the drone may be cloaked as a means to obscure or block the visible detection of the tethered drone 102 via the utilization of an inflight color matched video screen and color matching tether to match the color of the environment the tethered drone 102 is being used and as a means to limit the ability to identify the tethered drone 102. For example, panels of the tethered drone 102 may be utilized to match the environment around the tethered drone 102. Additionally, the tether 104 prevents the drone from being hacked or disrupted from a rogue control signal. An encrypted, virtual signal, or proprietary signal may be utilized by the tether between the tethered drone 102 and the control vehicle 106 (or other connected devices/systems) to prevent unwanted access to the tethered drone 102.

In one embodiment, the tethered drone 102 may be tethered to a building (i.e., structure 114) or vehicle (control vehicle 106) and used in crowded cities to find and indicate available parking in congested parking areas. The tethered drone 102 may utilize unique overhead views to provide various traffic and available parking data.

In one embodiment, the tethered drone 102 may be tethered to a building power source and act as a centurion drone to monitor activity and visitors outside and at a building's points of entry. The centurion drone can provide a wider parameter of surveillance around a building's exterior.

In one embodiment, the tethered drone 102 may be stored and then deployed during an emergency to more efficiently monitor the situation from an aerial viewpoint. The tethered drone 102 may also act as a wireless tower for performing wireless communications (e.g., cellular, Wi-Fi, etc.).

The tether 104 is formed from a high-tensile strength material. In one embodiment, the tether 104 may be composed of graphene. The tether 104 may also be formed from steel, carbon fiber, Kevlar, Zylon, glass, spider silk, boron nitride nanotubes, carbon nanotubes, or any number of other composites, mixtures, or combinations. The tether 104 may also include multiple layers to add strength, power conduction, and liquid delivery components. For example, a graphene layer with embedded conductors for communicating power may include fiber optics for communications and a rubber polymer, such as polyvinyl chloride, for communicating liquids to the tethered drone 102. The tether 104 may include any number of wires, cables, busses, fiber optics, hoses, or delivery mediums. The tether 104 may deliver power and fluids stored in one or more reservoirs of the control vehicle 106 to the drone. In one embodiment, a portion of the tether 104 proximate the tethered drone may stiffly or erectly extend from the top, bottom or sides of the tethered drone 102 to ensure that the tether 104 does not interfere with the propulsion systems (e.g., fans, propellers, jets, etc.). For example, batteries, generators, solar cells, fuel cells, or engines of the control vehicle 106 may communicate direct current or alternative current power to the drone 102.

The tethers 104 may also employ automated docking systems for adding the tethers utilizing a tether interface (e.g., lifting off from a vehicle docking station to a tether 104 attachment station). The tethered drone 102 may also hover at a convenient height for a user to safely attach the tether 104, such as slightly above the head of a user. As described herein, the tethered drone 102 may be tethered to the control vehicle 106. In another embodiment, the tethered drone 102 may be connected to the user 108 or structure 114. Docking stations may also be utilized to attach other tools, back-up batteries, or other systems for the tethered drone 102.

In one embodiment, the control vehicle 106 (or alternatively control system) may be utilized to transport, store, and launch the drone 102. For example, the control vehicle 106 may include one or more cradles, docking stations, launch pads, gantries, or so forth. The control vehicle 106 may both cover, secure, and launch the drone 102. Any number of latches, locks or securing mechanisms may secure and store the drone 102 for storage, travel, or so forth. The control vehicle 106 may also include any number of catapults, springs, levers, arms, or so forth utilized to facilitate launch of the drone 102. The control vehicle 106 may be configured to work with one or more drones at a time. The control vehicle 106 may also include reservoirs for pumping fluids, gasses, foams, slurries, or solids up to the drone 102. The drone 102 may have on or more outputs, nozzles, ports, or so forth for ejecting or otherwise communicating the materials received from the control vehicle 106.

The user 108 may utilize interfaces and controls available through the control vehicle 106. For example, a traditional drone controller may communicate with the control vehicle 106 (or with the tethered drone 102) to control the movement and operations of the tethered drone 102.

Figure 2:
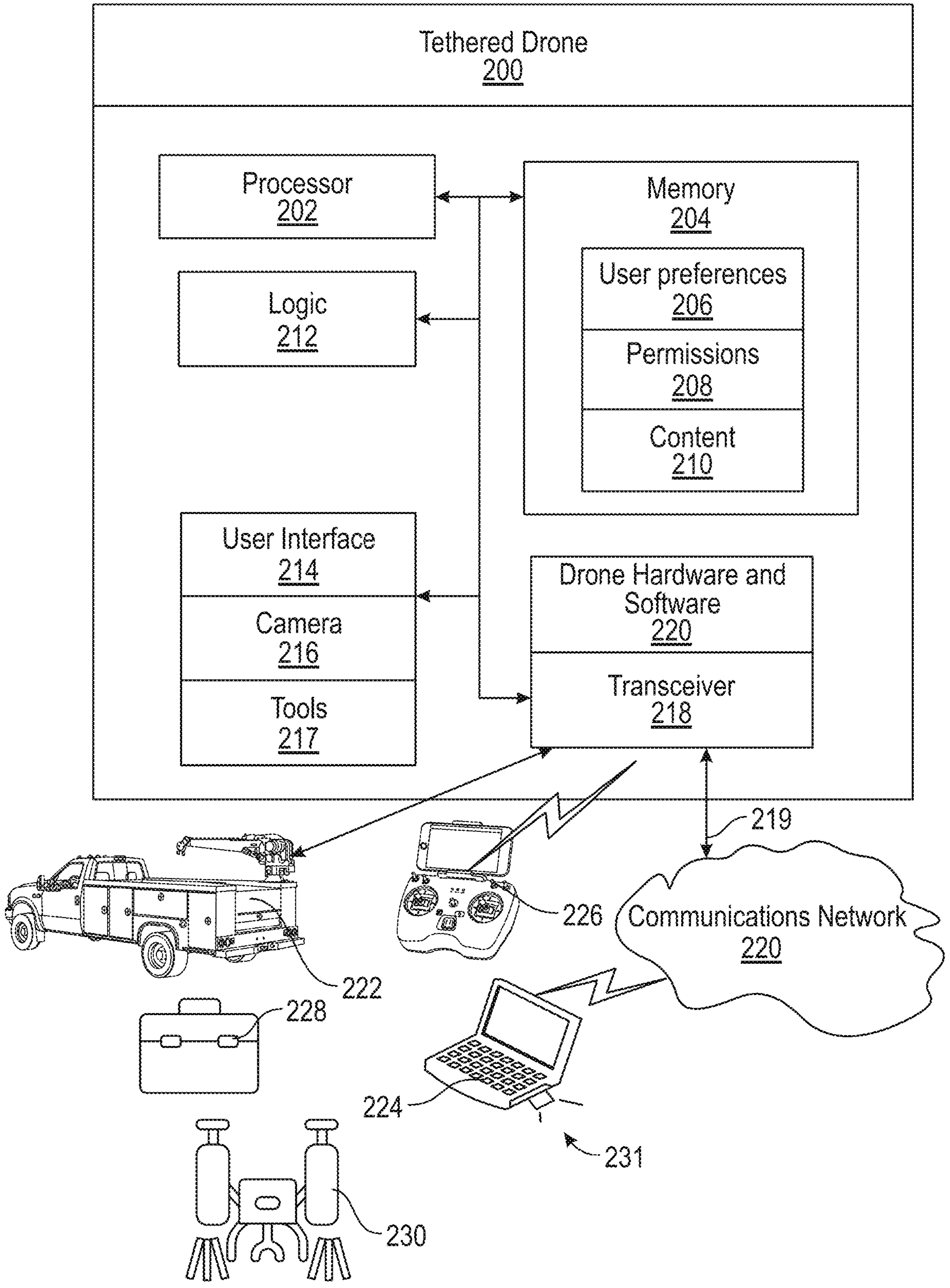
FIG. 2 is a block diagram of a tethered drone system in accordance with an illustrative embodiment.

FIG. 2 is a block diagram of a tethered drone 200 in accordance with an illustrative embodiment. In one embodiment, the tethered drone 200 may include a processor 202, memory 204, user preferences 206, permissions 208, content 210, logic 212, user interface 214, camera 216, tools 217, transceiver 218, tether 219, and hardware and software 220. The tethered drone 200 may communicate with communications network 220, and control systems 222, 224, 226, 228, and 230 (jointly "control systems 231). In one embodiment, the tethered drone 200 may be represented by a single device. In other embodiments, the tethered drone 200 may represent a number of networked drones that communicate and function together to perform the processes and tasks herein described. For example, tethered drones may be interconnected by a web of tether connections (e.g., in series, parallel, etc.). The tethered drones may also communicate as part of a mesh network. A master drone and slave drones may be utilized to accomplish the various processes herein described. For example, slave drones with multiple large rotors may carry and pump liquid to a master drone with a high pressure nozzle for washing windows and building exteriors.

As shown the control systems 231 may represent one or more vehicles, control centers, or devices that may communicate with the tethered drone 200 directly or indirectly through the communications network 220. Various embodiments of control systems 231 including a utility vehicle, tethered drone controller, controller box, docking drone, and laptop are shown. Other control systems 231, such as robots, mother ships, satellites, all-terrain vehicles, military equipment, farming equipment, and space shuttle, are also envisioned.

The processor 202 is circuitry or logic enabled to control execution of a set of instructions, application, operating system, kernel, modules, or program. The processor 202 may be a microprocessor, digital signal processor, logic unit, application-specific integrated circuits (ASIC), field programmable gate arrays (FPGA), central processing unit (CPU), or other device suitable for controlling an electronic device including one or more hardware and software elements, executing software, instructions, programs, and applications, converting and processing signals and information, and performing other related tasks. The processor 202 may be a single chip (e.g. ASIC, FPGA, microprocessor, etc.) or may be integrated with other computing or communications elements.

The memory 204 is a hardware element, device, or recording media configured to store data for subsequent retrieval or access at a later time. The memory 204 may be static or dynamic memory 204. The memory 204 may include a hard disk, random access memory, cache, removable media drive, mass storage, or configuration suitable as storage for data, instructions, and information. In one embodiment, the memory 204 and processor 202 may be integrated. The memory 204 may use any type of volatile or non-volatile storage techniques and mediums. The memory may store user preferences 206, permissions 208, and content 210.

In one embodiment, the memory 204 may store information retrieved by the tethered drone 200 (see for example FIG. 1). For example, the content 210 captured by the various devices and components, such as audio, video, and sensor data, may be stored and managed by the tethered drone 200. As a result, the applicable content 210 may be accessed in real-time or subsequently streamed or sent as needed. The memory 204 may store various data and information that are further associated with the content 210, such as date and time of capture, location, tools 217 utilized, observing device/user, type of device, fixed or mobile, authentication, facial/object recognition, and so forth. In some embodiments, the information may be integrated with the content to create augmented reality content. The memory 204 may also store hyperlinks, relevant data, or other references to interactive content that are accessible by communications received by the tethered drone 200.

The memory 204 may also store interactive content associated with the content 210 recorded on the tethered drone 200. The memory 204 may be partitioned for utilization by the various components of the tethered drone 200. The tethered drone 200 may include any number of computing and telecommunications components not specifically described herein for purposes of simplicity, such components, devices, or units may include busses, motherboards, circuits, ports, interfaces, cards, converters, adapters, connections, motors, propellers, engines, motor mounts, landing gear, booms, main done body, frame, global positioning system, jets, parachutes, actuators, controllers (i.e., electronic speed controllers, flight controllers, etc.), booms, gimbals (e.g., motors, control units, etc.), sensors (e.g., collision avoidance, radiation, chemical, speed/velocity, pressure, temperature, transceivers, lidar, infrared, time-of-flight, etc.), displays, antennas, batteries, and so forth that are referenced by the drone hardware and software 220.

In one embodiment, the user preferences 206 are settings, criteria, and parameters for controlling the functions, actions, controls, and communications features of the tethered drone 200. In one embodiment, the user preferences 206 may control registering and authenticating devices/users to control the tethered drone 200 based on available commands, applicable circumstances, feedback, and selections by a user. The user preferences 206 may also control actions taken if the connection with the tether 219 is lost. For example, the tethered drone 200 may automatically return to a designated location or signal if the tether 219 is severed.

The user preferences 206 may also include one or more names for a network broadcast, managed, accessed, utilized, distributed by the tethered drone 200. For example, the tethered drone 200 may activate a wireless router that communicates utilizing one or more secured, public, or private Wi-Fi, cellular, or other networks. In one embodiment, the user preferences 206 may store a number of different user profiles associated with a number of administrators or users or the tethered drone 200 or the control system 231. The user preferences 206 may store hardware identifiers, software identifiers, nicknames, contact lists, and access information including usernames and passwords, and other similar details, information and settings.

In one embodiment, the permissions 208 are the parameters that locally govern the management and utilization of the content 210. For example, the permissions 208 may establish types of content 210, authorize distribution, administrative access, sharing rights, and so forth for content 210 distributed through the tethered drone 200, as well as other allowed or prohibited content. In on embodiment, a number of users (e.g., administrators, managers, security personnel, authorized users, etc.) may utilize the tethered drone 200 and as a result the permissions 208 may set limits, settings, and parameters that locally govern utilization of the tethered drone 200. For example, the permissions 208 may establish authorization levels associated with content 210 that users of the tethered drone 200 may store and communicate to the control system 231.

As previously noted, the content 210 may store generated or measured by fixed cameras, sensors, or users, such as those using the wireless devices 222, 224, and 226. The captured content 210 may be stored temporarily, long-term, or permanently in the content 210 for subsequent access, management, or display (e.g., live stream to the wireless devices 222, 224, and 226). The content 210 may also be mirrored or stored in one or more cloud networks. For example, the content 210 may be automatically synchronized with a data storage server of a cloud service/network. By storing the data in the tethered drone 200 as well as in the cloud, the bandwidth utilized may be reduced, the time required to retrieve the content 210 is reduced, and other resources may be conserved.

The content 210 or the user preferences may also store preferences governing utilization, analysis, or sharing of the content 210. For example, the user preferences 206 may specify that the content 210 may be streamed to the control system 222 but may not be shared beyond that one authorized device/user. The content 210 that is generated from the tethered drone 200 and other devices may be saved strictly to the tethered drone 200, control systems 231, or may be saved to remote devices or networks, such as a content-based social networks, cloud network services, content servers, or so forth. The optical and sensor data, files, feed, and information may be saved in the content 210 or saved as a link accessible from one or more other drones or through other networks.

The user interface 214 is an audio, visual, or tactile interface for displaying video, images, data, text, and information to a user and receiving user input, feedback, selections, and commands for controlling the tethered drone 200. The user interface 214 may generate a graphical user interface for communication to one or more interconnected displays or the control systems 231. The user interface 214 may include any number of joysticks, levers, buttons, scroll wheels, screens, touch interfaces, or other elements for receiving and outputting information to the tethered drone 200 for controlling power, hovering rotation, altitude, throttle, yaw, pitch, roll, trim, camera control (e.g., interconnected camera gimble movement, video/image capture, imaging type, etc.). In one embodiment, the user interface 214 may provide an interface for receiving input from a transmitter, controller, touch screens, a mouse, microphones, gesture controls, keyboards, peripherals, or so forth. As a result, the user interface 214 may also include a keyboard, a touch screen, a Braille interface, speakers, a microphone, and other similar input and output devices. The wireless devices 222, 224, and 226 may also interact directly with the user interface 214 for receiving input and displaying information.

The camera 216 is a video and image capture device(s). The camera 216 may also represent dedicated or fixed video cameras associated with a venue or location. The images may include still and video images that may be retrieved and stored in the memory 204 or communicated directly to one or more other users. In one embodiment, the camera 216 may be integrated with the tethered drone 200. In another embodiment, the camera may be externally linked utilizing any number of wireless or wired connections, such as a high definition media interface (HDMI), USB, Bluetooth, or Wi-Fi connection. The camera 216 may capture the content 210 for storage. The camera 216 may also be representative of the cameras of the control systems 231 that may transmit content to the tethered drone 200. For example, the tethered drone 200 may act as a video router with images, audio, video, text input or a combination thereof communicated from and received by the tethered drone 200.

The transceiver 218 is a component comprising both a transmitter and receiver which may be combined and share common circuitry on a single housing. The transceiver 218 may communicate utilizing Bluetooth, Wi-Fi, ZigBee, Ant+, near field communications, wireless USB, infrared, mobile body area networks, ultra-wideband communications, cellular (e.g., 3G, 4G, 5G, PCS, GSM, etc.) or other suitable radio frequency standards, networks, protocols, or communications. The transceiver 218 may include a number of different transceivers configured to utilize distinct communications protocols and standards. For example, the transceiver 218 may be a hybrid transceiver that supports a number of different communications. For example, the transceiver 218 may communicate utilizing Ethernet, powerline networking, Wi-Fi, Bluetooth, and cellular signals.

The tether 219 may be connected between the tethered drone 200 and one or more of the control systems 231 by one or more users or technicians. In another embodiment, the tether 219 may include magnetic ends with an interface for easily connecting to the control systems 231. For example, magnetic pins may align for communicating power and data between the control systems 231 and the tethered drone 200. The interface of the tether 219 for both the tethered drone and the control systems 231 may also include any number of locking interfaces and ports (e.g., bearing interfaces, screw type interfaces, release-based interfaces, etc.).

The drone hardware and software 220 are the additional hardware and software components and units that allow the tethered drone 200 to function and interact. The tethered drone 200 includes motor controls for controlling the flight, position, and orientation of the tethered drone. In one embodiment, the drone hardware and software 220 may include logical components for converting signals into media content and interactive content that may be displayed to display. The drone hardware and software 220 may also incorporate network interface elements for communicating with the communications network 222 which may include a Wi-Fi, cellular, powerline, satellite, cable, DSL, IPTV, or other networks. For example, the content 210 may be decoded and reformatted for display by the control systems. For example, the drone hardware and software 220 may format the satellite signals for display to the user and similarly, may function to display a message icon at the same time the standard content is displayed to the user.

Figure 3:
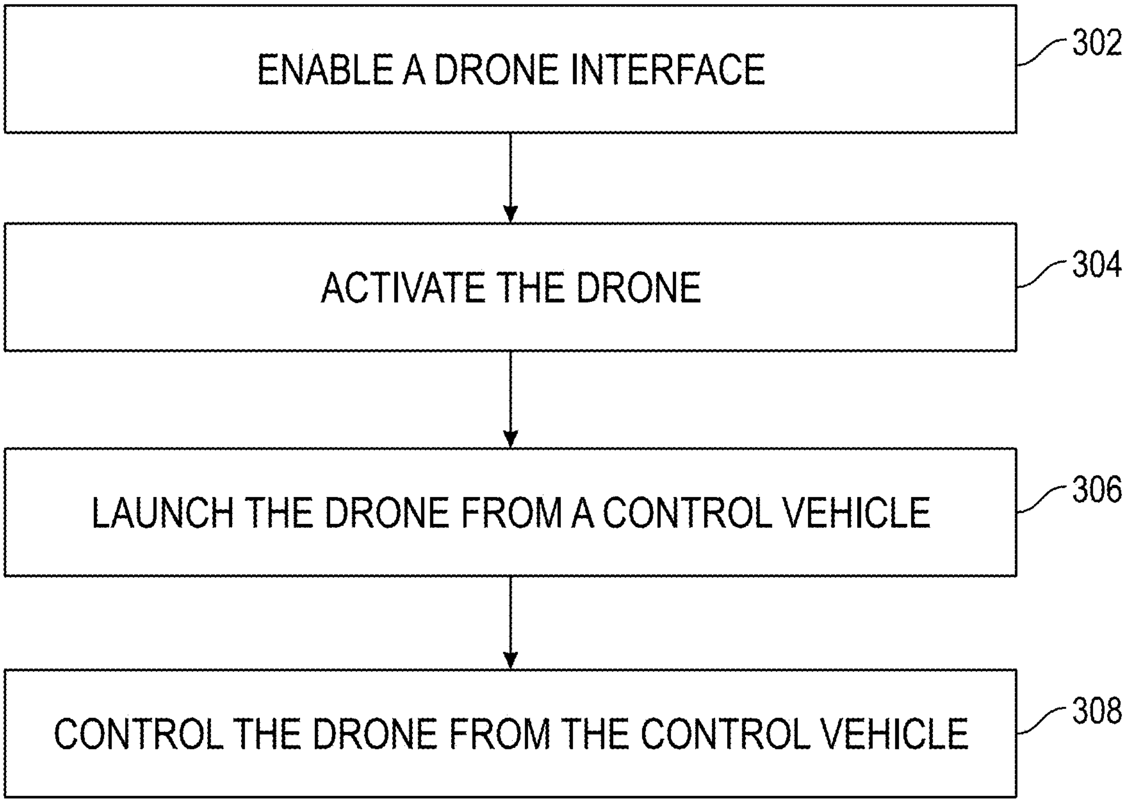
FIG. 3 is a flowchart of a process for controlling a tethered drone system in accordance with an illustrative embodiment.

FIG. 3 is a flowchart of a process for controlling a tethered drone in accordance with an illustrative embodiment. The process of FIGS. 3 and 4 may be implemented by a tethered drone system, such as those shown in FIGS. 1 and 2. In one embodiment, the tethered drone system may include a flying drone physically connected to a control vehicle by a tether. The tether may include one or more wires, cables, buses, hoses, or other communications mediums for sending signals, fluids, solids, or so forth.

In one embodiment, the process may begin by enabling a drone interface (step 302). The drone interface may be independent or integrated with the control vehicle. The drone interface may include joy sticks, switches, buttons, toggles, touch screens, virtual reality controls, augmented reality controls, gesture controls (e.g., accelerometers, gyroscopes, magnetometers, etc.), or so forth. In one example, the user may power on the drone interface (e.g., utilizing a switch, button, etc.). The drone interface may also be integrated in a briefcase, carrying box, or so forth.

Next, the tethered drone system activates the drone (step 304). In one embodiment, the drone may be activated by a control signal sent from the drone interface to the drone. For example, the drone may be a flying drone with multiple propellers. In another embodiment, the drone may be a drone that utilizes suction or negative pressure to climb or ascend buildings or other structures. In another embodiment, the drone may utilize robotic arms to climb or wheels to move from place to place. Jet propulsion may also be utilized in water or air.

Next, the tethered drone system launches the drone from a control vehicle (step 306). In one embodiment, the drone is a mobile platform for moving the drone between locations (e.g., utility vehicle, all-terrain vehicle, truck, car, train, ferry, plane, hovercraft, motorcycle, bicycle, etc.). The control vehicle may provide a controlled environment from which to operate the drone. In one embodiment, the UAV is equipped to provide industrial services though the addition of interchangeable cleaning liquids through the tether for machinery, table, window, household, and toilet cleaning, sterilization, and maintenance. For example, the control vehicle may include one or more camera systems for monitoring the drone and environment of the control vehicle, climate controls (e.g., air conditioning, heaters, etc.), batteries or power generators for powering the drone through the tether, reservoirs for storing fluids, gases, or solids communicated through the tether, pumps for pumping fluids or solids through a hose of the tether, and the drone interface. In one embodiment, the control vehicle is a utility vehicle utilized to wash and inspect windows of high rises and other buildings.

In one embodiment, the tethered drone system may include a cradle, docking station, storage bin, compartment, cover, port, mini-hanger, or other components that may be integrated with or attached to the control vehicle. The storage may be utilized to securely move the drone from location to location before launching the drone.

Next, the tethered drone system controls the drone from the control vehicle (step 308). The drone interface may include controls for managing the altitude, pitch, yaw, speed, orientation, direction, integrated tools, components, and functions, externally connected tools, components, and functions.

Figure 4:
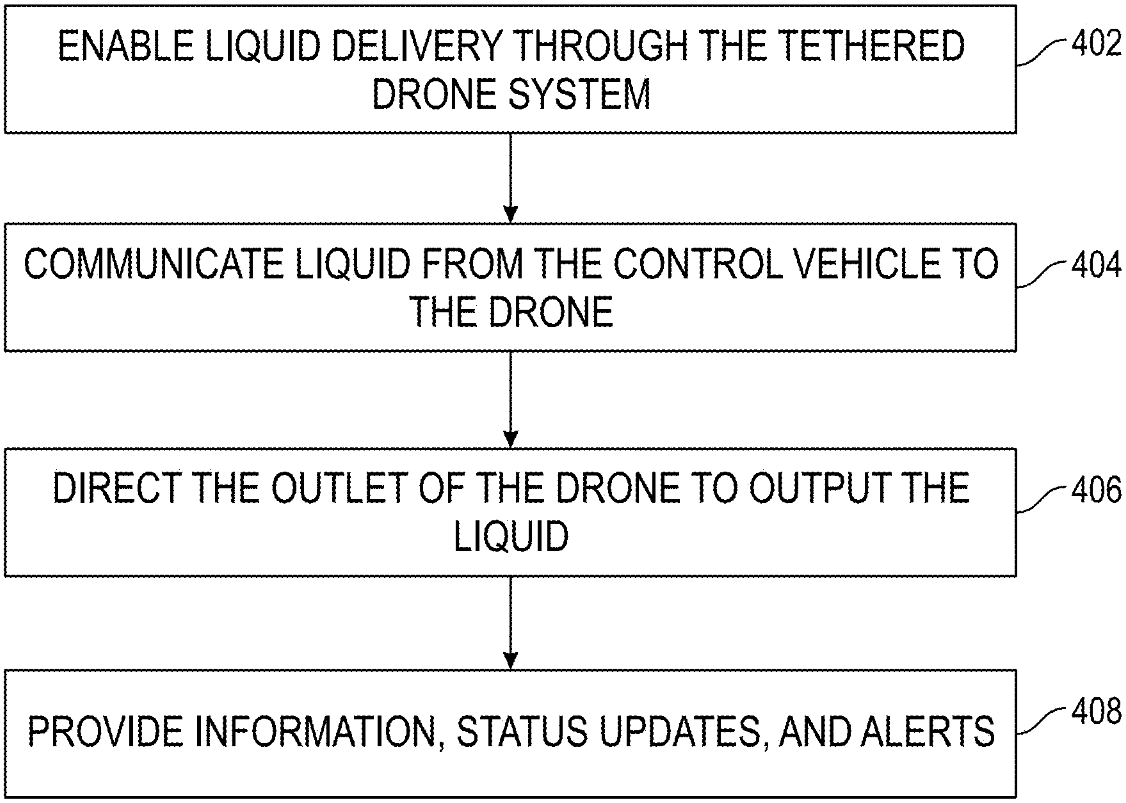
FIG. 4 is a flowchart of a process for utilizing a tethered drone system in accordance with an illustrative embodiment.

FIG. 4 is a flowchart of a process for utilizing a tethered drone system in accordance with an illustrative embodiment. The process of FIG. 4 may also be performed by the tethered drone system. The process of FIG. 4 may begin by enabling liquid delivery through the tethered drone system (step 402). In one embodiment, the process of FIG. 4 may be performed as part of the process of step 308 of FIG. 3.

Next, the tethered drone system communicates liquid from the control vehicle to the drone (step 404). Although liquids are mentioned specifically, the drone may communicate liquids, foams, slurries, gases, solids, or other compounds for extinguishing fires, cleaning, performing testing or analysis, imaging/photography, or so forth. In one embodiment, the liquids may be communicated and expelled from the drone in real-time. For example, the drone may include a nozzle for spraying the liquid. For example, the vehicle may pump the liquid to the drone under pressure for expulsion from the drone. In another embodiment, the tethered drone may include a reservoir. The liquid may be stored in the drone for utilization. In some embodiments, fluid flowing through the tether may cause variations in drone flying dynamics.

Next, the tethered drone system directs an outlet of the drone to output the liquid (step 406). The outlet may represent any number of nozzles, jets, faucets, or so forth. The spray pattern and output volume may be adjusted controlled from the drone interface. In addition, pumps, condensers, aerators, sprayers, or other components may also be utilized. In one embodiment, the drone may compress, focus, or otherwise direct the liquid.

Next, the tethered drone system provides information, status updates, and alerts (step 408). In one embodiment, the information and data of step 408 may relate to separate and combined performance of the drone, tether, and control vehicle. For example, the information may indicate information, such as flight/operation time, motor temperatures, motor revolutions per minute, outside temperature, humidity, light conditions, exterior noise levels, battery reserve levels, fluid reserves, fluid communicated, altitude, location, orientation, proximity to people, structures, and devices, generator/battery reserves of the control vehicle, and so forth. The alerts may indicate if there are any errors (e.g., insignificant, minor, major, catastrophic, etc.), imminent failures, maintenance issues, or problems with the tethered drone system.

Figure 5:
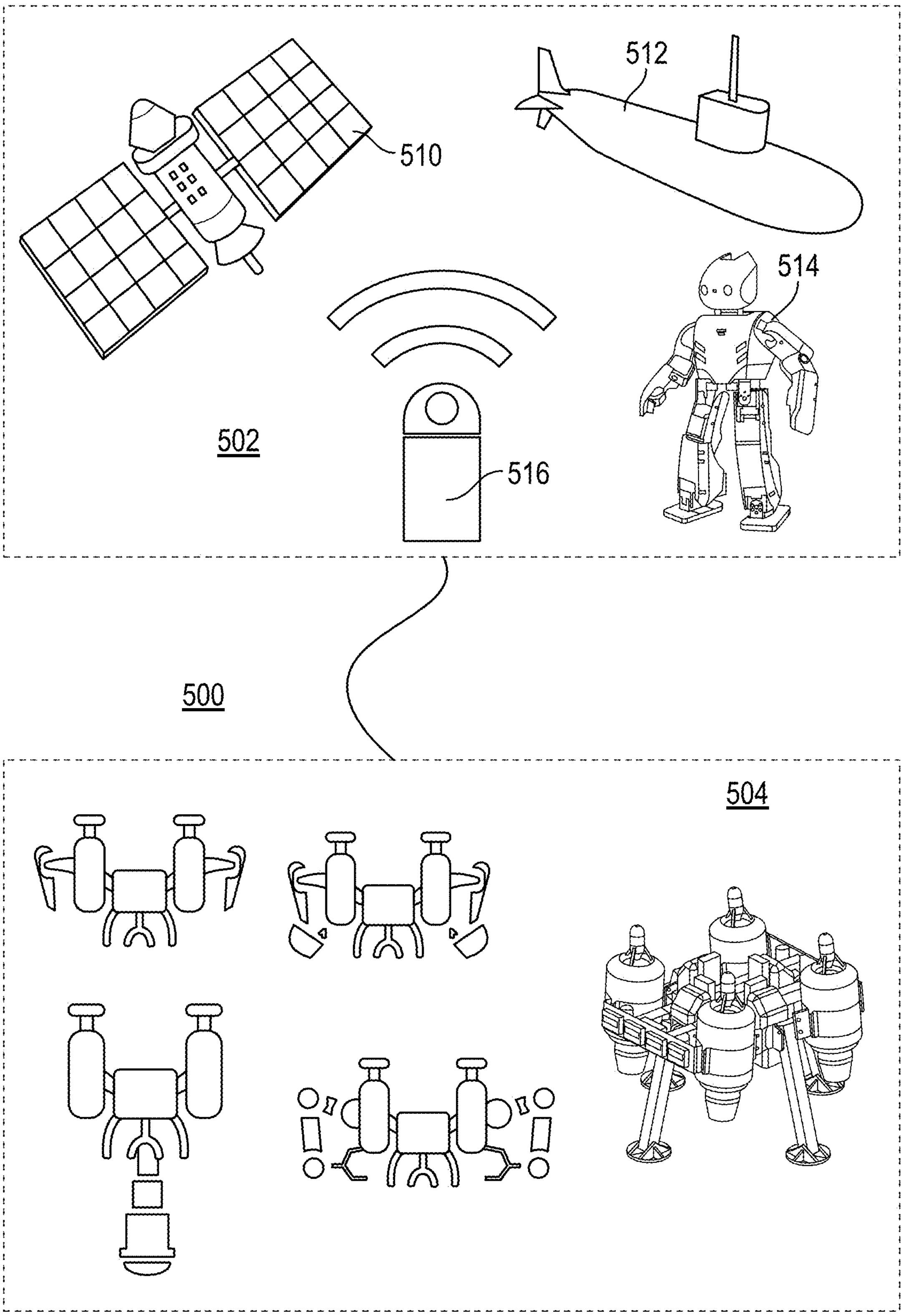
FIG. 5 is a pictorial representation of a tethered drone system operated from a platform in accordance with an illustrative embodiment.

FIG. 5 is a pictorial representation of a tethered drone system 500 operated from a platform in accordance with an illustrative embodiment. The tethered drone system 500 may include a platform 502 operating a tethered drone 504 through a tether 506. The platform 502 may include, but is not limited to, a satellite 510, a submarine 512, robot 514, and/or a command center 516. Other platforms may include drone ships, utility vehicles, carry boxes, autonomous robots, flying ship hubs, shuttles, orbital vehicles, and so forth. The tethered drone 504 may represent any number of air, land, water, or space-based drones. The tethered drones 504 may perform material retrieval, repairs, exploration, remote sensing, or any number of other processes.

The platform 502 may be operated by one or more service providers, operators, individuals, private entities, organizations, governments, or other parties. In one embodiment, the command center 516 may represent a private Internet based control center that may remotely control the tethered drone 504. The command center 516 may connect directly to the tethered drone 504 or may do so through communications with the satellite 510, the submarine 512, robot 514, or another platform 502. The tethered drone system 500 may utilize satellite, Wi-Fi, Bluetooth, cellular, acoustic, wired (e.g., Fiber optics, twisted pairs, serial, etc.), or other long-range or short-range wireless or wired signals, mediums, protocols, or standards. For example, terrestrial command centers may communicate with the satellite 510 to perform any number of tasks with the tethered drone 504. Audio, video, data, and sensor readings may be shared between the various devices and systems of the tethered drone system 500.

In one embodiment, the platform 502 may represent a control vehicle, station, or object. The tethered drone 504 may be integrated with, attached to, or interface with the platform 502. For example, the tethered drone 504 may be manufactured as an integral part of the platform 502. In another example, the tethered drone 504 may be attached to or connected to the platform 502 (at any time).

The robot 514 may represent any number of human controlled, autonomous, or other vehicles, humanoids, or systems. The tethered drone 504 may be deployed to perform tasks that are out of reach, dangerous, involve unknown objects/chemicals/animals, or otherwise require investigation and analysis.

The tethered drone system 500 may be utilized for or to enhance any number of systems, such as solar energy operations, industrial and commercial services, engineering, manufacturing, space exploration, mining (e.g., undersea, terrestrial, space-based, etc.), astronomy, scientific analysis, crop and food monitoring, and other applicable operations.

The tethered drone system 500 may be utilized with multiple tethered drones that are each connected to the platform 502 or to each other. For example, the tethered drones may operate as a swarm, hive, or organization of drones to perform various tasks.

Figure 6:
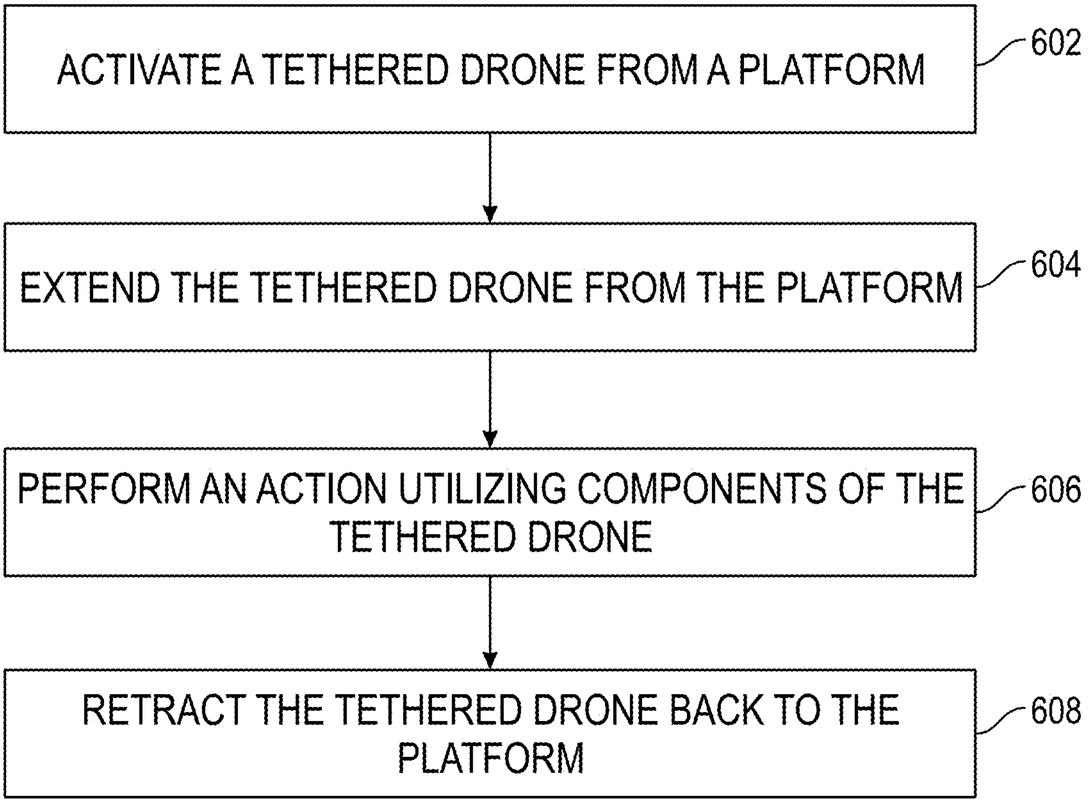
FIG. 6 is a flowchart of a process for operating a tethered drone system from a platform in accordance with an illustrative embodiment.

FIG. 6 is a flowchart of a process for operating a tethered drone system from a platform in accordance with an illustrative embodiment. The tethered drone may represent any number of environments, drones, and associated platforms as previously described including aerial, space-based, water (e.g., freshwater, saltwater, etc.), land-based, and so forth.

In one embodiment, the process may begin by activating a tethered drone from a platform (step 602). In one embodiment, the platform may represent an orbital satellite. In another embodiment, the platform may represent a submarine or drone ship. The tethered drone may include one or more thrusters, rockets, jets, propellers, or other drives for propelling the tethered drone in the applicable medium (e.g., space, water, air, etc.). The activation of step 602 may include powering on the tethered drone, executing one or more applications, operating systems, kernels, or software instructions, activating hardware, components, firmware, and features of the tethered drone, and engaging the platform to control the tethered drone.

Next, the tethered drone system extends the tethered drone from the platform (step 604). During step 604, the tethered drone may be driven or propelled from the platform to an applicable position, location, object, structure, or coordinates. The tether may be released based on a pulling force from the tethered drone or may be automatically spooled out by the platform. The shape, size, and configuration of the tethered drone may also vary based on the applicable environment. For example, the tether (and tethered drone) may be shielded against radiation, space dust, and micro projectiles in space-based applications. In another example, the tether (and tethered drone) may be waterproof, pressure protected (e.g., deep water), corrosion resistant, impact resistant, and so forth. The tethered drone may utilize any number of redundant systems to ensure operation when connected to the tether as well as when this connected (intentionally or unintentionally). For example, the tethered drone may include secondary transceivers that may be utilized in the environment in response to the tether being severed or damaged.

Next, the tethered drone system performs an action utilizing components of the tethered drone (step 606). The tethered drone may be equipped with any number of components, subsystems, features, or functions. In one embodiment, the tethered drone may include one or more cameras and sensors for close proximity, midrange, or long-range observation, remote-sensing, monitoring, analysis, or so forth. The cameras may utilize any number of wavelengths (e.g., visible light, ultraviolet, infrared, x-ray, etc.) and visualization processes. Any number of spectroscopy systems may be integrated with the tethered drone. The cameras may also represent high end telescopes that may broadcast applicable images to a base station, control vehicle, command center, or other associated devices/systems. In another embodiment, the tethered drone may include one or more sampling devices (e.g., suction and collection devices, drills, grasping devices, etc.) that may be utilized for sampling gases, liquids, solids, and/or other compounds or mixtures accessible by the tethered drone. For example, the tethered drone may include one or more arms for retrieving samples, objects, or materials. The tethered drone may also include any number of tools (e.g., welders, saws, drills, impact devices, etc.) for building, maintaining, or repairing any number of objects, structures, vehicles, or so forth. The tethered drone may also be utilized to perform surgery on an individual that is out of reach (e.g., a mountain climbing accident, etc.). The samples may be collected for exploration, mining, threat analysis, environmental protection, scientific/chemical analysis, or any number of other purposes. Sample analysis may be performed by the tethered drone or the platform. For example, a spectroscopy system of the tethered drone or the platform may perform optical analysis of the sample. In another example, the tethered drone may only perform collection with all additional analysis and processing performed by the platform or a secondary device, system, equipment, users, or so forth. In one embodiment, the tethered shown may also include one or more offensive or defensive weapons for animals, plant life, people, projectiles, or so forth. Some examples may include guns, electrifying devices, rockets, grenades, optical weapons (e.g., lasers, focus light, etc.), sonic weapons, or other applicable weapons systems. The action of step 606 may include firing, discharging, or otherwise utilizing the applicable weapon system.

Next, the tethered drone system retracts the tethered drone back to the platform (step 608). As previously noted, the tethered drone may move, maneuver, or propagate utilizing motors, engines, jets, thrusters, or other propulsion mechanisms integrated with or attached to the tethered drone. Alternatively, the tethered drone may be retracted utilizing forces applied to the tether, such as reeling in the tethered drone utilizing the applicable tether. During step 608, the tethered drone may be docked with, stored within, attached to, or placed on the platform.

The illustrative embodiments are not to be limited to the particular embodiments and examples described herein. In particular, the illustrative embodiments contemplate numerous variations in the type of ways in which embodiments of the invention may be applied to numerous tethered drone applications on land, sea, air, or in space. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments disclosed with greater particularity.

What is claimed is:

1. A tethered drone system, comprising:

a tethered drone including a tether, wherein the tether includes one or more electrical conductors configured to communicate power and control signals, and one or more fluid conduits configured to convey one or more fluids; the tethered drone is enabled to connect or disconnect from a second tethered drone to communicate the power, the control signals, and the one or more fluids to the second tethered drone; and a control system configured to receive the tethered drone, wherein the control system provides power for the tethered drone, the control system includes an automated docking system configured to reel in the tether to draw the tethered drone into a cradle, and one or more latches configured to automatically lock the tethered drone in the cradle for transport or storage, and wherein the control system includes a user interface for controlling the control signals, and wherein the control system automatically guides the tethered drone or the second tethered drone to a designated landing location in response to detecting tether severance.

2. The tethered drone system of claim 1, wherein the tether communicates a liquid from the control system to an outlet extending from the drone.

3. The tethered drone system of claim 1, further comprising:

one or more cameras integrated with the drone.

4. The tethered drone system of claim 1, further comprising:

a plurality of propellers providing lift and throttle to the tethered drone.

5. The tethered drone system of claim 1, wherein the control system is integrated with a utility truck utilized to wash and inspect windows of buildings.

6. The tethered drone system of claim 1, wherein the user interface includes controls for altitude and directional controls.

7. The tethered drone system of claim 1, wherein the control system includes a landing pad for landing the tethered drone.

8. The tethered drone system of claim 5, wherein at least a portion of the tether outputs a liquid.

9. The tethered drone system of claim 1, wherein the tethered drone is utilized in space and utilizes a propellant for propulsion.

10. The tethered drone system of claim 1, wherein the control system is onboard a control vehicle.

11. The tethered drone system of claim 1, wherein the tether is formed at least in part of graphene.

12. The tethered drone system of claim 1, wherein the tethered drone is autonomously controlled utilizing the control signals sent from the control system, the control system onboard a vehicle.

13. The tethered drone system of claim 1, wherein the control system comprising the user interface incudes at least a touch screen showing information associated with the tethered drone.

14. A method for utilizing a tethered drone, comprising:

activating controls for the tethered drone;

releasing the tethered drone from one or more latches that lock the tethered drone in place in a cradle when not in use;

launching the tethered drone from a control vehicle while a tether extends between the control vehicle and the tethered drone, wherein the tether communicates at least power and control signals;

controlling the tethered drone by the control vehicle, wherein the control vehicle is configured to detect tether severance while the tethered drone is deployed and to automatically guide the tethered drone to a designated landing location upon tether severance;

reeling in the tether using an automated docking system of the control vehicle to draw the tethered drone into the cradle; and automatically locking the tethered drone in the cradle using the one or more latches for transport or storage.

15. The method of claim 14, further comprising:

communicating a liquid through the tether.

16. The method of claim 15, further comprising outputting the liquid from the tethered drone.

17. The method of claim 14, wherein the control vehicle operates in space, and wherein the tethered drone utilizes a propellant for propulsion.

18. The method of claim 14, further comprising:

capturing video from the tethered drone and the control vehicle.

19. The method of claim 14, wherein the tethered drone operates autonomously based on logic.

20. A tethered drone system, comprising:

a first tethered drone including a tether, wherein the first tethered drone includes a receptacle for storing a fluid, wherein the tether includes one or more electrical conductors to communicate at least power and control signals, and one or more fluid conduits to convey the fluid;

a second tethered drone connected to the first tethered drone by the tether to receive at least power, control signals, and the fluid, the second tethered drone delivers the fluid through one or more nozzles; and a docking system configured to extend and reel in the tether, wherein the docking system includes one or more latches configured to automatically lock the first tethered drone in a first cradle and the second tethered drone in place in a second cradle for storage and transport;

a control system configured to control the first tethered drone and the second tethered drone, wherein the control system provides power for the first tethered drone and the second tethered drone, and wherein the control system includes a user interface for controlling the control signals, and wherein the control system automatically guides the first tethered drone or the second tethered drone to a designated landing location in response to detecting tether severance.

* * * * *